(12) United States Patent
Matsubara et al.

(10) Patent No.: US 8,156,803 B2
(45) Date of Patent: Apr. 17, 2012

(54) LIQUID LEVEL DETECTION APPARATUS FOR ENGINE OIL

(75) Inventors: Yasunori Matsubara, Wako (JP); Toshikazu Nakamura, Wako (JP); Yoshihiro Iijima, Wasko (JP)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 11/993,488

(22) PCT Filed: Jun. 16, 2006

(86) PCT No.: PCT/JP2006/312554
§ 371 (c)(1),
(2), (4) Date: Jun. 25, 2009

(87) PCT Pub. No.: WO2006/137501
PCT Pub. Date: Dec. 28, 2006

(65) Prior Publication Data
US 2010/0024544 A1    Feb. 4, 2010

(30) Foreign Application Priority Data
Jun. 23, 2005  (JP) .................................. 2005-183038

(51) Int. Cl.
*G01F 23/30* (2006.01)
(52) U.S. Cl. .......................................................... 73/305

(58) Field of Classification Search .................. 73/322.5, 73/313, 314, 305, 308; 200/84 R
See application file for complete search history.

(56) References Cited

U.S. PATENT DOCUMENTS

| 2,780,692 | A | * | 2/1957 | Thomas Hinojosa ....... 200/84 R |
| 4,473,730 | A | * | 9/1984 | Ida .............................. 200/84 R |
| 4,848,151 | A | | 7/1989 | Bruder et al. |

FOREIGN PATENT DOCUMENTS

| EP | 0 163 500 A2 | 12/1985 |
| FR | 2 295 857 A1 | 7/1976 |
| FR | 2 733 587 A1 | 10/1996 |
| JP | 56-56143 U | 5/1981 |
| JP | 60-75709 A | 4/1985 |
| JP | 6-167378 A | 6/1994 |
| JP | 6-226379 A | 8/1994 |

OTHER PUBLICATIONS

International Search Report of PCT/JP2006/312554, date of mailing Dec. 4, 2006.

* cited by examiner

*Primary Examiner* — Hezron E Williams
*Assistant Examiner* — Tamiko Bellamy
(74) *Attorney, Agent, or Firm* — Westerman, Hattori, Daniels & Adrian, LLP (57) ABSTRACT

A float-type oil-level detection apparatus is provided for detecting the surface of engine oil. A housing (81) for housing a float (82) has a through-hole (136) in the sidewall of the side opposite from the sidewall that faces the movement of the oil dipper (69).

6 Claims, 11 Drawing Sheets

LIQUID LEVEL DETECTION APPARATUS FOR ENGINE OIL

TECHNICAL FIELD

The present invention relates to a detection apparatus for detecting a drop in the surface level of engine oil.

BACKGROUND ART

Japanese Utility Model Application Laid-open No. 56-56143 discloses an engine oil surface level detection apparatus. This level detection apparatus is described below with reference to FIG. 12.

Figure 12:
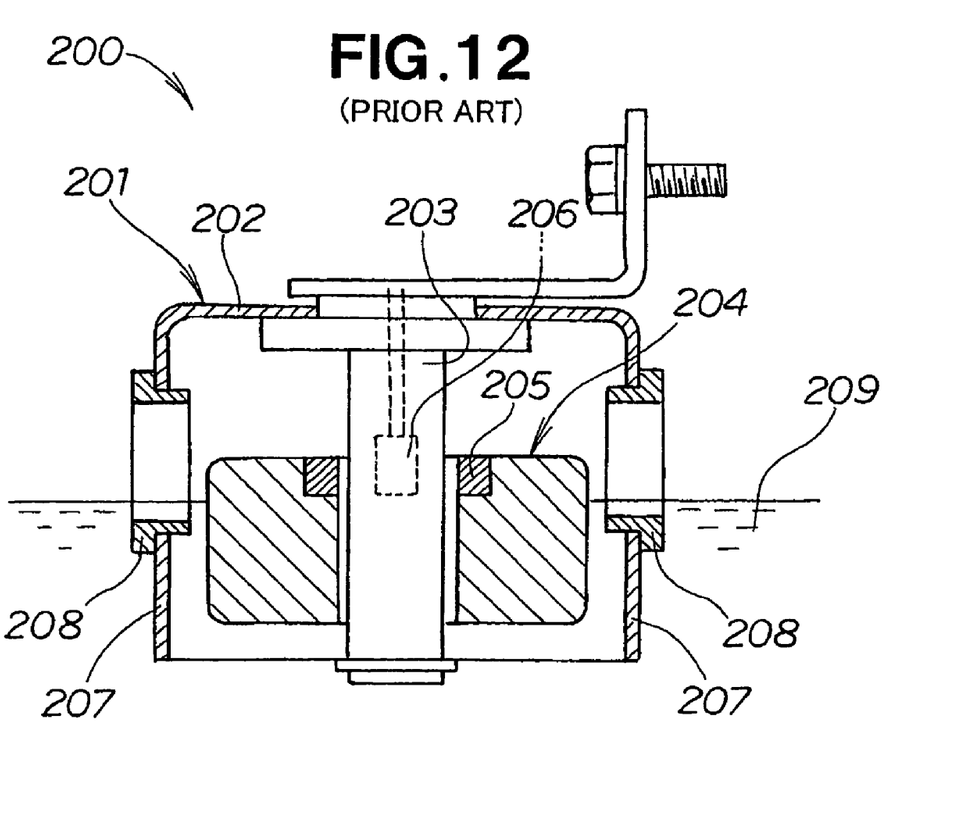
FIG. 12 is a diagram showing a conventional float-type oil-level detection apparatus.

The level detection apparatus 200 shown in FIG. 12 is composed of a housing 201 whose lower portion is open, a shaft 203 that extends downward so as to be suspended from the ceiling 202 of the housing 201, a float 204 that is slidably mounted on the shaft 203, a magnet 205 provided to the float 204, a reed switch 206 housed in the shaft 203 and actuated by the approach of the magnet 205, cylindrical bushes 208 and 208 mounted on the opening formed in the side walls 207 and 207 of the housing 201, and a crankcase for holding engine oil 209.

However, in the level detection apparatus 200, the side walls 207 and 207 of the housing 201 are open by way of the cylindrical bushes 208 and 208. Therefore, the surface level of the oil is susceptible to transient fluctuations when the engine oil 209 in the crankcase is lifted up.

Wiring is furthermore laborious in that wires must be laid out in the oil in order to draw out the wires of the reed switch 206.

In view of the above, there is a need for an engine oil-level detection apparatus that can avoid being susceptible to fluctuations in the surface level of the oil and that can simplify the procedure for drawing out wires from a switch.

DISCLOSURE OF THE INVENTION

An object of the present invention is to provide an engine oil-level detection apparatus that can accurately give notification of a low oil level, and to provide an engine oil-level detection apparatus that can simplify the procedure for drawing out wires from a switch.

Provided in the present invention is an oil-level detection apparatus that detects the surface level of oil in the oil pooling chamber of the engine, characterized by having a float which floats in the oil, a switch actuated by the movement the float, and a housing for housing the float and the switch, wherein the housing has, in the sidewall on the opposite side of the sidewall that faces the movement of an oil dipper, a through-hole that leads to the oil pooling, chamber, when the dipper for lifting up the oil moves in the vicinity of the housing.

Therefore, the oil in the housing avoids susceptibility to transient fluctuations in the surface level due to the oil dipper, a drop in the surface level of oil can be unerringly detected, and an improvement in the reliability of an oil-level detection apparatus can be ensured.

The switch preferably has a conduction piece disposed under the float, and a plus contact piece and a minus contact piece disposed on the housing while allowed to be in contact with the conduction piece. A simple switch that can be used in oil can therefore be realized. As a result, a decrease in the cost of an oil-level detection apparatus can be assured.

The housing is preferably mounted with the plus contact piece and the minus contact piece, and comprises a housing main body for accommodating the float, an upper cover for covering the upper portion of the housing main body, a lower cover for covering the lower portion of the housing main body, and an extension portion that extends from one end of the housing main body, wherein one end of the extension portion can be mounted on the engine main body, and the sidewall is the lower cover. The ease of assembly can therefore be improved when the float is elevatably accommodated. As a result, the improvement in the productivity of the oil-level detection apparatus can be assured.

The extension portion is preferably provided with a bus bar to which the plus contact piece and the minus contact piece are connected. The switch wires can therefore be laid out in a simple manner. As a result, an improvement in the reliability of the switch in the oil can be ensured.

The lower cover preferably has a tapered portion that is formed on the bottom surface of the side that faces the movement direction of the dipper. Therefore, the lower cover is not directly affected when the oil shakes due to the lifting movement of the oil dipper, and an improvement in the reliability of the oil-level detection apparatus is assured.

The upper cover and lower cover preferably have stop portions for stopping the housing main body, and the housing main body has pawls for engaging the stop portions. Assembling the housing can therefore be facilitated. As a result, an improvement in the ease of assembly can be assured.

The lower cover preferably has a lower hole for allowing oil to flow from the lower portion of the lower cover into the housing main body.

The upper cover preferably has an upper hole for allowing oil that has splashed up to flow into the housing main body.

BEST MODE FOR CARRYING OUT THE INVENTION

Figure 1:
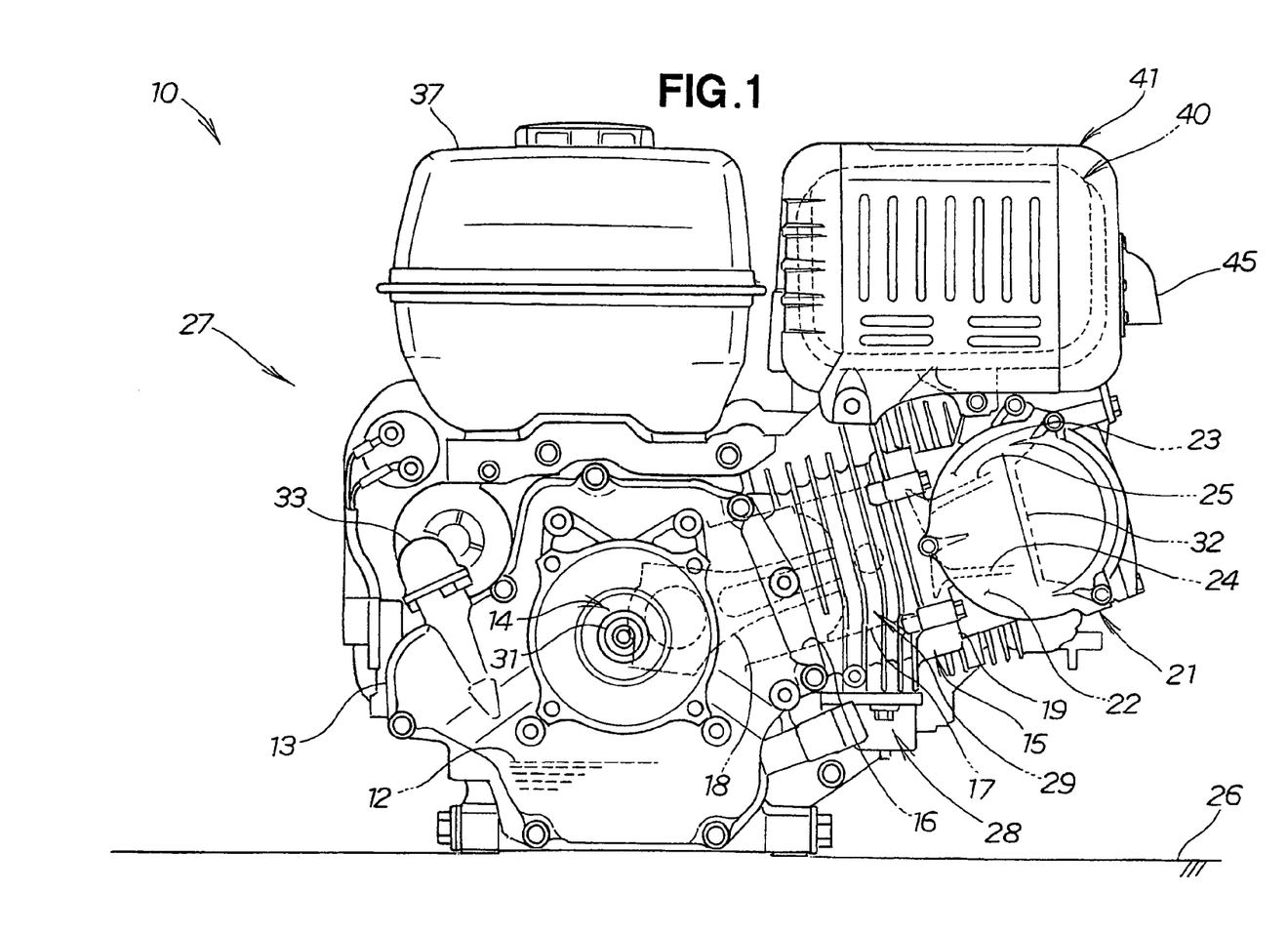
FIG. 1 is a front view of an engine in which the oil-level detection apparatus of the present invention has been adopted.

The engine unit 10 shown in FIGS. 1 to 3 has an engine main body (hereinafter simply referred to as "engine") 27, and auxiliary equipment, which includes accessories for operating the engine 27. The auxiliary equipment principally includes an air cleaner 35 for suctioning outside air, a carburetor 36 for vaporizing and feeding fuel (gasoline) to the combustion chamber 29, a fuel tank 37 for storing fuel, a muffler 40 for reducing the exhaust noise of the exhaust gas, a recoil starter 39 for starting the engine 10, an oil-level detection apparatus (oil alert) 50 for detecting the surface of the oil, and a plug gap 60 housed in the ignition section (not shown) that is used for ignition. The engine main body 27 of the example shown in the diagrams is an overhead-camshaft (OHC) air-cooled engine with a sloped cylinder.

The engine 27 is provided with a crankcase 13 for holding engine oil 12, a crank shaft 14 as an output shaft that is horizontally and rotatably mounted on the crankcase 13, a single cylinder block 15 integrally formed at an incline on the crankcase 13, a piston 17 slidably mounted on a cylinder 16 of the cylinder block 15, a connecting rod 18 that links the piston 17 and crank shaft 14, a cylinder head 21 mounted in the opening 19 of the cylinder block 15, an air intake valve 24 disposed on the air intake port 22 of the cylinder head 21, and an exhaust valve 25 disposed on the fuel cell 23 of the cylinder head 21. The cylinder block 15 slopes toward the ground surface 26 (horizontal surface).

The casing 28 is formed with the crankcase 13, cylinder block 15, and cylinder head 21. The combustion chamber 29 is formed with a cylinder block 15 and a cylinder head 21.

The crank shaft 14 has a power take-off 31 at one end. The power take-off 31 may be referred to as "PTO".

The cylinder head 21 is provided with a valve movement chamber 32 for driving the air intake valve 24 and exhaust valve 25 by using the rotation of the crank shaft 14.

In the diagram, the reference numeral 33 is an oil level gauge. An exhaust pipe 45 for discharging exhaust gas is mounted on a muffler cover 41.

Figure 2:
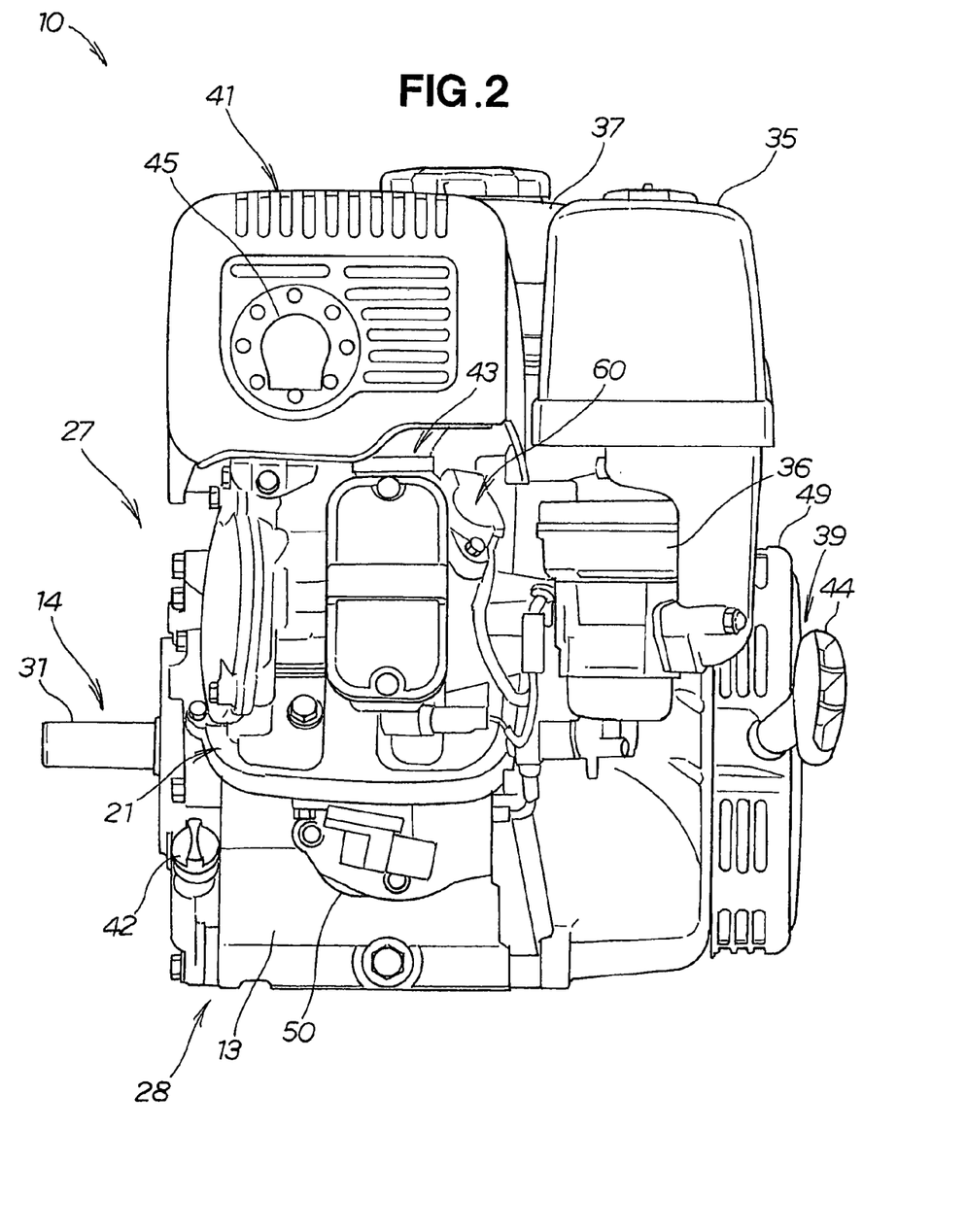
FIG. 2 is a right side view of FIG. 1.

Oil is fed from an oil supply port 42, as shown in FIG. 2. One end of an exhaust tube 43 extends from the cylinder head 21. The muffler 40 is mounted on the other end of the exhaust tube 43. The recoil starter 39 has a start knob (grip) 44.

Figure 3:
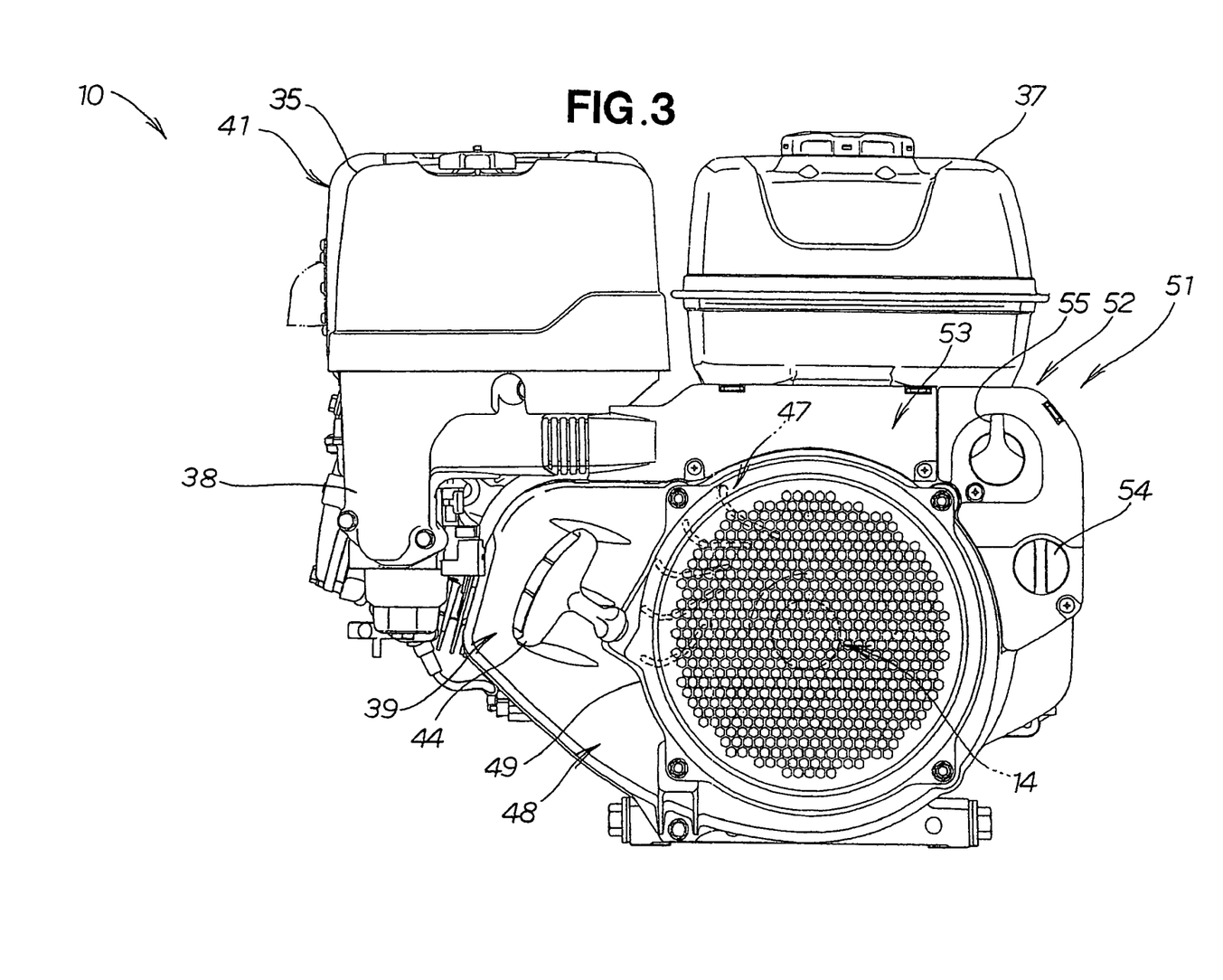
FIG. 3 is a rear side view of FIG. 1.

A generator (not shown) and a cooling fan 47 are mounted on the opposite side of the power take-off 31 of the crank shaft 14 (see FIG. 2), as shown in FIG. 3. A fan cover 48 covers and protects the cooling fan 47. The recoil starter 39 is covered by a recoil starter cover 49. A main panel 52 is disposed on the upper side of the recoil starter cover 49. The cover panel 53 is continuous to the main panel 52, and is disposed between the fuel tank 37 and recoil starter cover 49.

An operation panel is composed of a main panel 52 and a cover panel 53. Disposed on the main panel 52 are a switch knob 54 whereby the engine 27 can be switched on, and an adjustment knob 55 for adjusting the characteristics of a governor motor (not shown) provided to the carburetor 36 (see FIG. 2).

Figure 4:
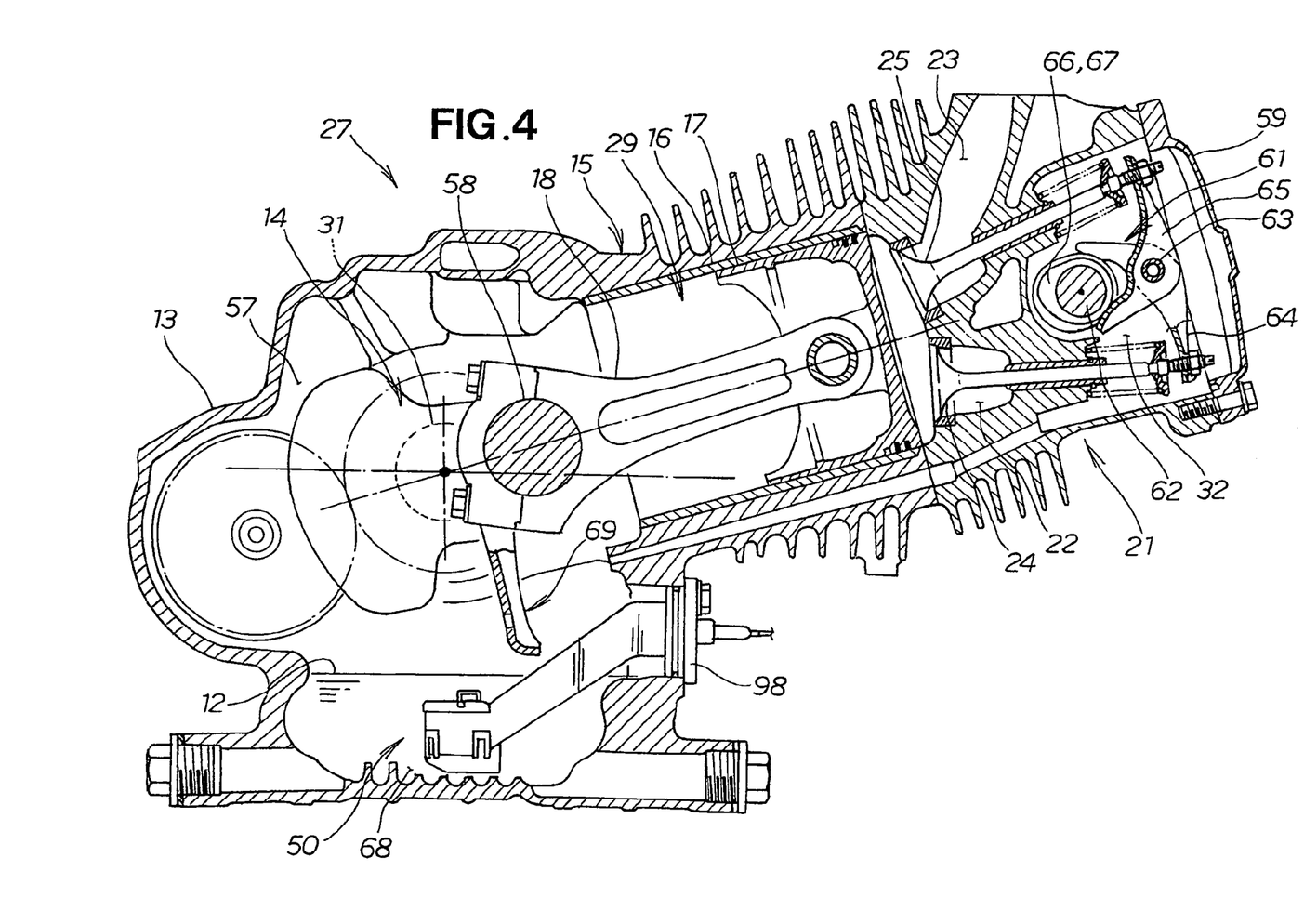
FIG. 4 is a front cross-sectional view of FIG. 1.

The crankcase 13 accommodates and rotatably supports the crank shaft 14, as shown in FIG. 4. The crank shaft 14 is linked to the connecting rod 18 via a crank pin 58. The piston 17 is linked to the connecting rod 18.

The cylinder 16 is formed inside the cylinder block 15. The cylinder head 21 is mounted at the distal end of the cylinder block 15 by using a plurality of bolts. The combustion chamber 29 is formed between the distal end of the cylinder 16 and the cylinder head 21. The air intake port 22 and fuel cell 23 are formed on the cylinder head 21.

The valve movement chamber 32 is formed by enclosing the distal end portion of the cylinder head 21 with the aid of a head cover 59. A valve movement mechanism 61 is disposed in the valve movement chamber 32.

The valve movement mechanism 61 is composed of a cam shaft 62, a rocker arm 63, an air intake valve rocker arm 64, and an exhaust valve rocker arm 65.

The cam shaft 62 is driven by the crank shaft 14 via a power transmission mechanism (not shown). The cam shaft 62 is provided with an air intake valve drive cam 66 and an exhaust valve drive cam 67. In other words, the air intake valve drive cam 66 and exhaust valve drive cam 67 rotate in accompaniment with the rotation of the cam shaft 62, cause the air intake and exhaust valve rocker arms 64 and 65 to swing, and open and close the air intake and exhaust ports 24 and 25 with a prescribed open and close timing.

Figure 5:
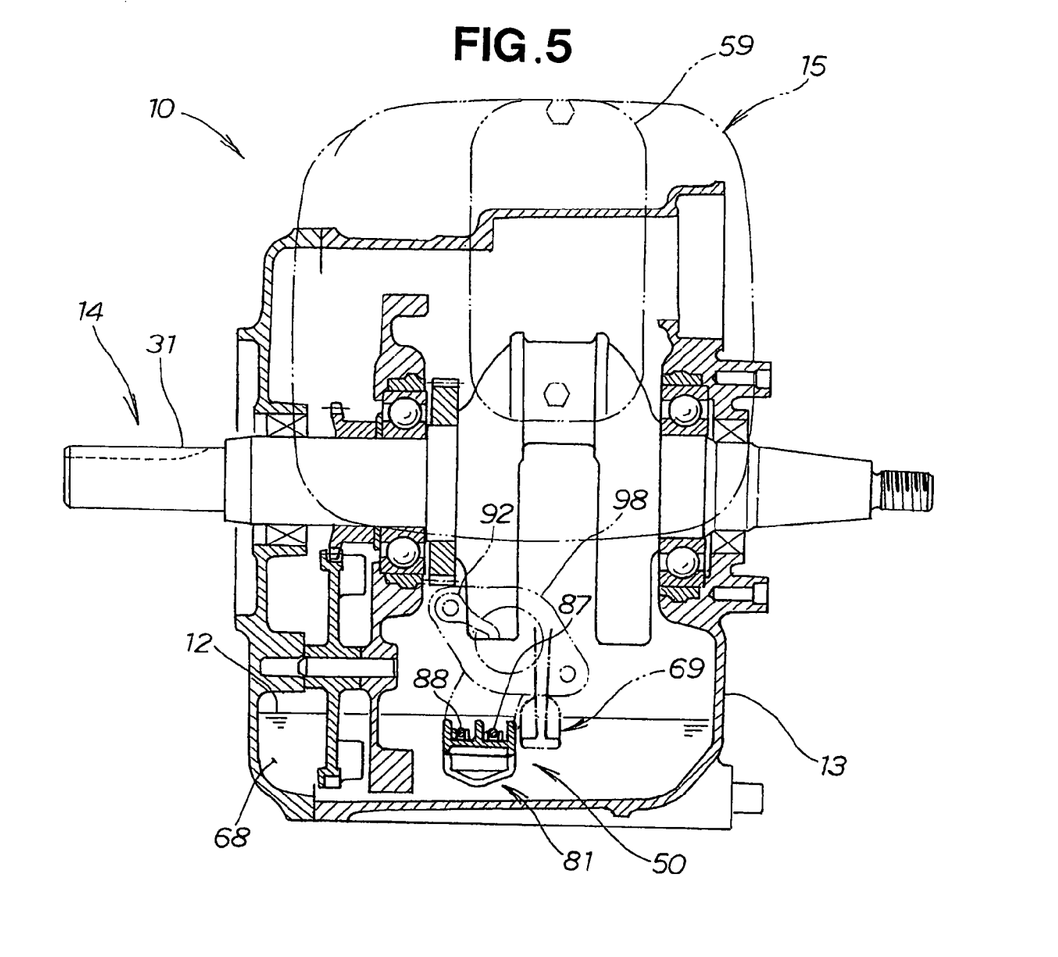
FIG. 5 is a right side cross-sectional view of FIG. 1.
Figure 6:
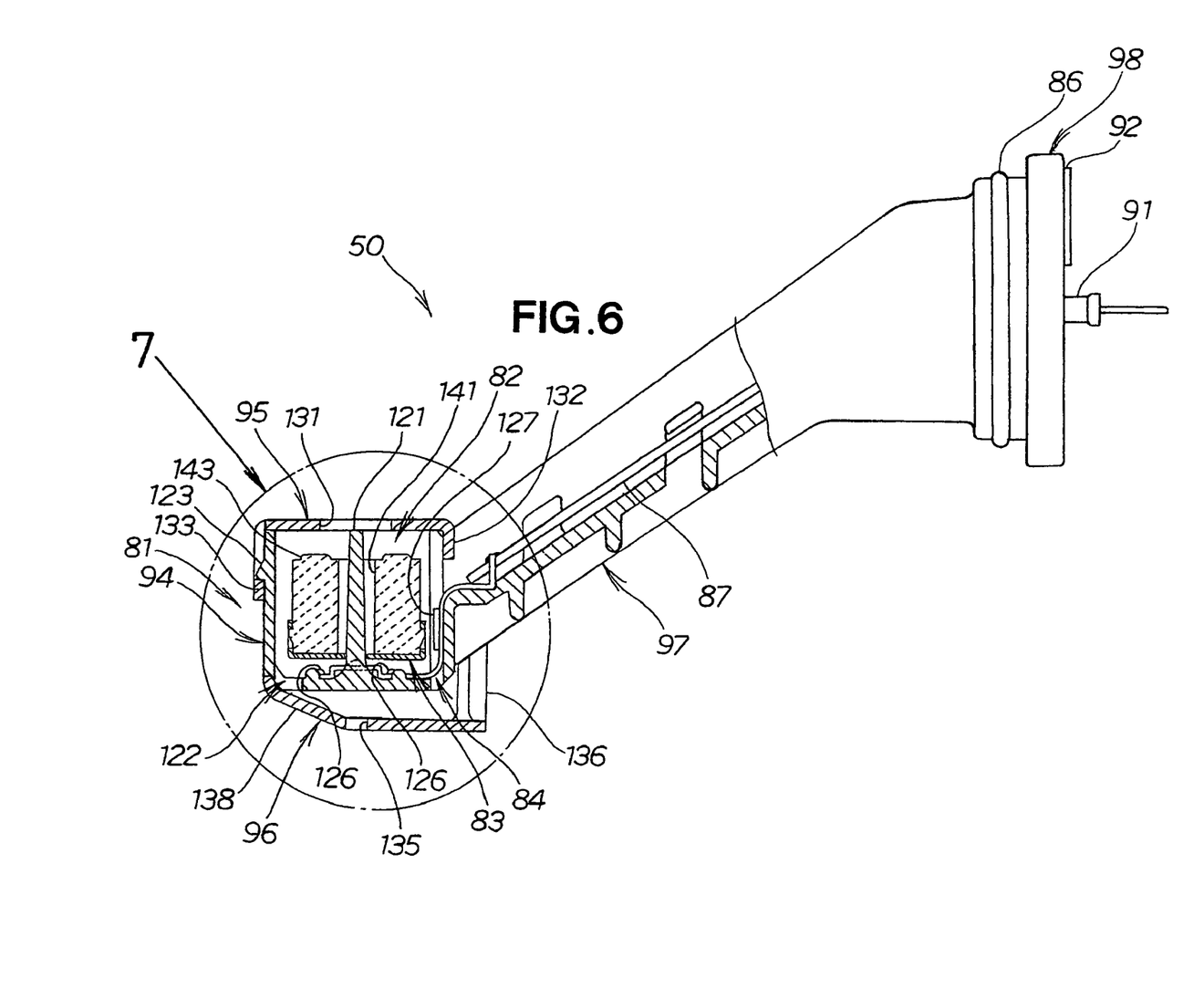
FIG. 6 is a front cross-sectional view of the oil-level detection apparatus of the present invention.

Furthermore, the engine unit 10 is provided with an oil dipper 69 that lifts engine oil 12 in accompaniment with the rotation of the crank shaft 14 inside the crankcase 13 and supplies oil 12 to the sliding parts, and a float-type oil-level detection apparatus (oil alert) 50 for detecting the surface level of the oil, as shown in FIG. 5.

The connecting rod 18 is provided with an oil dipper 69 for lifting the oil in the oil pooling chamber (oil pan) 68 of the crank chamber 57. The oil dipper 69 lifts the oil 12 pooled in the oil pooling chamber 68 of the crank chamber 57 in a single direction by rotating in a substantially elliptical manner (FIG. 11) in accompaniment with the rotation of the crank shaft 14, and lubricates the area about the cylinder 16 and the crank chamber 57 by dispersing the oil in the crank chamber 57 and the cylinder head 21.

Examples of the oil-level detection apparatus 50 of the present invention are described in detail below with reference to FIGS. 6 to 10.

Figure 10:
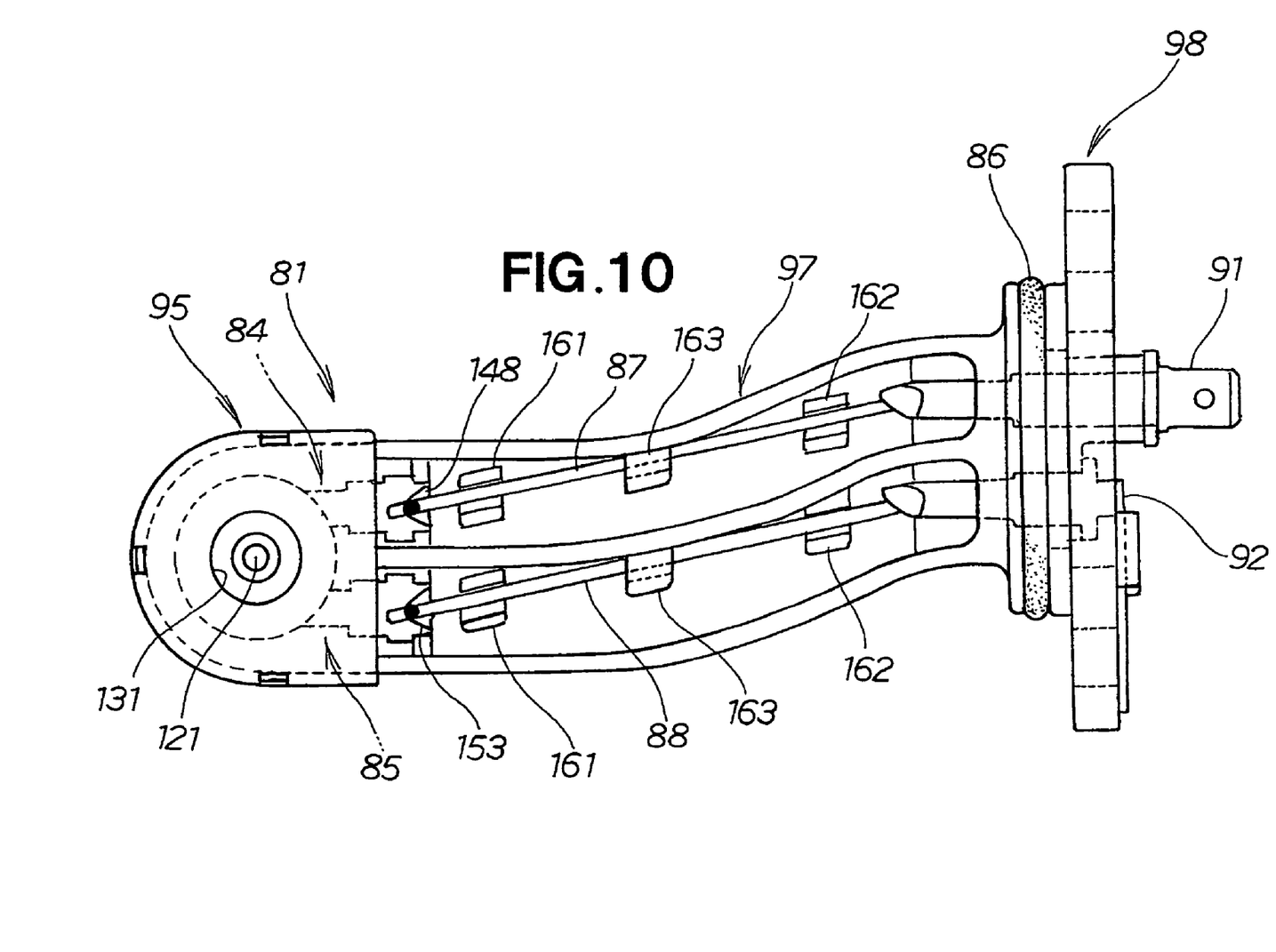
FIG. 10 is a plan view of FIG. 6.

The oil-level detection apparatus 50 is composed of a housing 81 that is formed with resin, a float 82 that is elevatably accommodated inside the housing 81, an electrical conduction piece 83 mounted on the float 82, a plus contact piece 84 and a minus contact piece 85 that are disposed on the housing 81 side for making contact with the electrical conduction piece 83 (FIG. 8), an oil ring 86 disposed on the seal portion of the housing 81, a plus-side bus bar 87 connected to the plus contact piece 84, a plus terminal 91 connected to the distal end of the plus-side bus bar 87, a minus-side bus bar 88 connected to the minus contact piece 85 (see FIG. 10), and a minus terminal 92 connected to the distal end of the minus-side bus bar 88 (see FIG. 10).

The housing 81 is composed of a housing main body 94 in which the plus contact piece 84 and minus contact piece 85 are mounted, an upper cover 95 for covering the upper portion of the housing main body 94, a lower cover 96 for covering the lower portion of the housing main body 94, an extension portion 97 that extends from the housing main body 94, and a mount portion 98 formed at the distal end of the extension portion 97 and used for setting the oil-level detection apparatus 50 in the oil pooling chamber 68 (see FIG. 4). When the oil-level detection apparatus 50 is set inside the oil pooling chamber 68 from the exterior of the engine main body 27, the housing 81 is inserted in the hole formed in the crankcase 13 and the mount portion 98 is fixed to the crankcase 13 by using bolts, as shown in FIG. 4.

Thus, the float 82 is inserted into a support column 121 so that the float 82 elevatably moves along the support column 121 (FIG. 7) formed in the housing main body 94 described below, and the upper cover 95 and lower cover 96 are merely mounted on the housing main body 94. Therefore, the housing 81 is easily assembled and the productivity of the oil-level detection apparatus 50 is improved.

Figure 7:
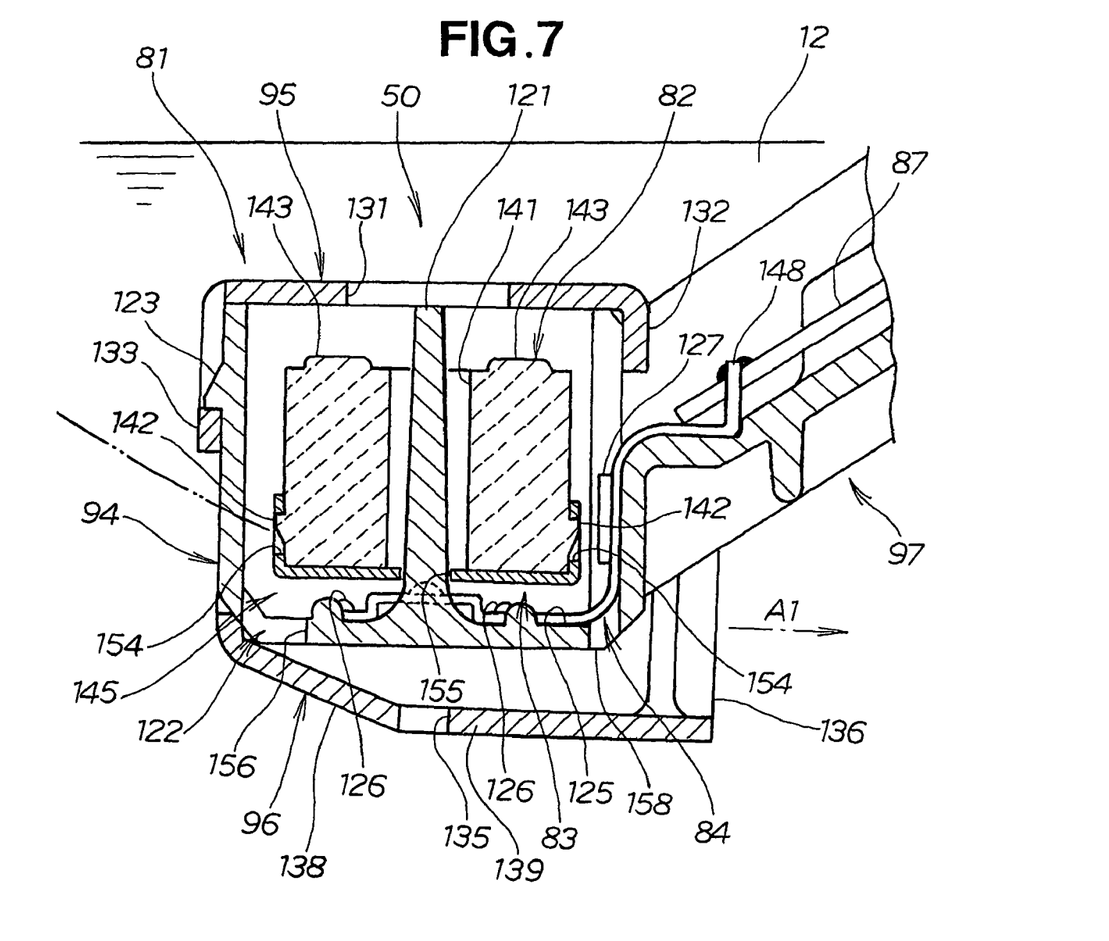
FIG. 7 is an enlarged view of the component indicated by the reference numeral 7 shown in FIG. 6.

The housing main body 94 has the support column 121 that stands erect in the upward direction from substantially the center of the bottom portion 125 and elevatably supports the float 82, a group of oil holes 122 formed in the bottom portion 125 so that oil 12 can flow into the housing 81, a plurality of pawls 123 for latching and mounting the upper cover 95, a plurality of pawls 124 for latching and mounting the lower case 96 (FIG. 9), a plurality of stop bosses 126 formed on the bottom portion 125 for stopping the plus contact piece 84 and minus contact piece 85 (FIG. 8) on the bottom portion 125, and fasteners 127 and 127 for guiding and fixing the plus contact piece 84 and minus contact piece 85 to the plus-side bus bar 87 and minus-side bus bar 88 (FIG. 10), as shown in FIG. 7.

The upper cover 95 is provided with an upper hole 131 that allows oil 12 to flow into the housing main body 94, a flange 132 for covering the side surface of the housing main body 94, and a plurality of stop portions 133 interlocked with the plurality of pawls 123 of the housing main body 94 by being extended from the flange 132. When the engine 27 is operating at high revolutions, the oil surface is kept at a low level by the high-speed rotation of the oil dipper 69. The oil level detection apparatus 50 therefore sometimes creates a malfunction.

In view of this situation, by forming an upper hole 131 in the upper cover 95, oil 12 that has been upwardly dispersed flows into the housing main body 94 from above the upper hole 131. For this reason, the oil in the housing main body 94 has little fluctuation and is stable even during high revolutions of the engine 27. As a result, the oil level can be stably detected by the float 82.

The lower cover 96 is provided with a lower hole 135 through which oil 12 flows, a through-hole (opening) 136 formed in the wall of the side that is opposite to the direction in which the oil dipper 69 elliptically moves (i.e., the rearward side) in coordination with the crank shaft 14 (see FIG. 4), a plurality of stop portions 137 for engaging the pawls 124 of the housing main body 94 (see FIG. 9), and a tapered portion 138 formed so that the bottom portion positioned on the side facing the movement of the oil dipper 69 (i.e., frontward side) slopes upward.

When the engine 27 has started or is operating at low revolutions, the revolutions of the oil dipper 69 are also low, long waves are generated on the surface of the oil, the oil 12 in the housing main body 94 readily flows out in response to the disturbance of the oil surface, and the float 82 sometimes drops. In view of this situation, the lower cover 96 is disposed below the housing main body 94 in order to prevent the oil 12 inside the housing main body 94 from rapidly dropping, and the disturbance of the oil surface in the housing main body 94 is reduced. In other words, the lower cover 96 is a buffer plate for slowing a rapid drop in the surface of the oil within the housing main body 94. More specifically, a prescribed distance (space) is maintained between the bottom portion 125 of the housing main body 94 and the bottom portion 139 of the lower cover 96, and the oil 12 in the space is used to buffer the oil 12 within the housing main body 94 so as to avoid a rapid drop in the oil level. Therefore, the oil level can be stably detected by keeping the fluctuations of the oil low within the housing main body 94 even when the engine 27 is operating at low revolutions.

More particularly, the fluctuations of the oil surface within the housing main body 94 can be reduced by providing the lower hole 135 to the lower cover 96.

The front portion of the bottom portion 139 of the lower cover 96 has a tapered portion 138 formed so as to be upwardly sloped facing the movement of the oil dipper 69. The fluctuations of the oil 12 due to the lifting action of the oil dipper 69 are therefore induced toward the area below the lower cover 96, and the lower cover 96 is less likely to be affected by the fluctuations of the oil 12. As a result, the reliability of the oil-level detection apparatus 50 is improved.

The float 82 is provided with a through-hole 141 for insertion of the support column 121 of the housing main body 94, stop projections 142 and 142 for mounting the conduction piece 83 in the lower portion, and a convexity 143 that makes contact with the upper cover 95.

The conduction piece 83 is provided with fitting holes 154 and 154 that engage the stop projections 142 and 142 of the float 82, and a hole 155 through which the support column 121 of the housing main body 94 completely passes.

The arrow A1 indicated by a dashed line shows the trajectory and direction of the movement at the distal end portion of the oil dipper 69 (see FIG. 4).

Figure 8:
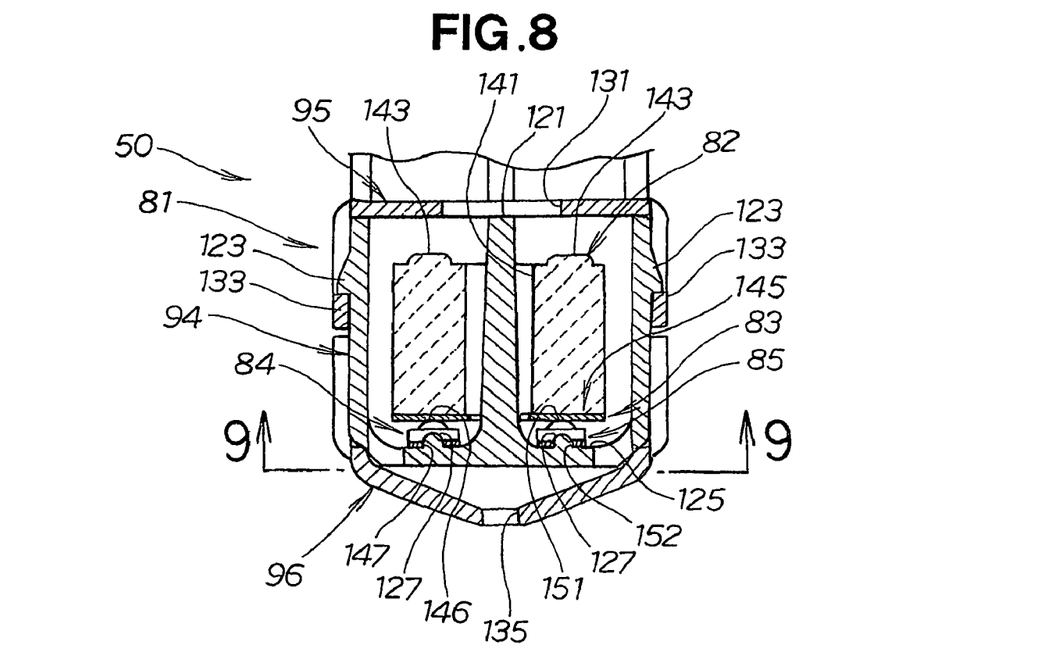
FIG. 8 is a left side cross-sectional view of the oil-level detection apparatus.

A switch 145 is composed of the conduction piece 83 mounted on the lower surface of the float 82, and the plus contact piece 84 and minus contact piece 85 mounted on the housing main body 94, as shown in FIG. 8. The oil-level detection apparatus 50 can therefore be used in the oil.

The plus contact piece 84 has a convex contact portion 146 that makes contact with the conduction piece 83, a mounting hole 147 for mounting the stop boss 126 (FIG. 7) of the housing main body 94, and a connection portion 148 for connecting to the bus bar 81 shown in FIG. 10.

The minus contact piece 85 has a convex contact portion 151 that makes contact with the conduction piece 83, a mounting hole 152 for mounting the stop boss 126 of the housing main body 94, and a connection portion 153 for connecting to the bus bar 88 shown in FIG. 10.

Figure 9:
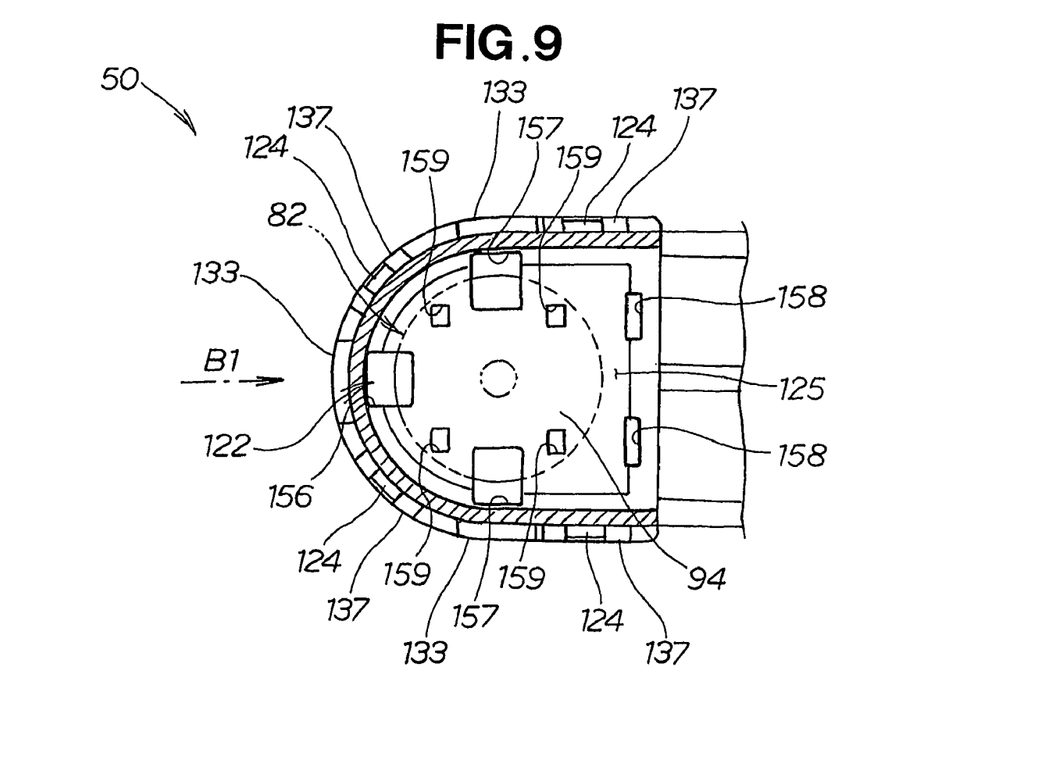
FIG. 9 is a cross-sectional view along the line 9-9 of FIG. 8.

In FIG. 9, the group of oil holes 122 formed on the housing main body 94 is composed of a large square hole 156 formed in the front portion of the bottom portion 125, large square holes 157 and 157 formed on both sides of the bottom portion 125, rectangular holes 158 and 158 formed in the rearward portion of the bottom portion 125, and a plurality of small square holes 159 formed in the vicinity of the center of the bottom portion 125.

The arrow B1 indicated by a dashed line shows the movement direction of the oil dipper 69.

The upper cover 95 has a stop portion 133 formed in three locations. The lower cover 96 has a stop portion 137 formed in four locations. The stop portions 133 and 137 are formed in an alternating fashion.

Thus, the housing 81 of the oil-level detection apparatus 50 can be easily assembled because the upper cover 95 and lower cover 96 each have a plurality of stop portions 133 and 137 for stopping the housing main body 94, and the housing main body 94 has a plurality of pawls 123 and 124 that engage the plurality of stop portions 133 and 137. As a result, the manufacture of an oil-level detection apparatus 50 is made simple.

The bus bars 87 and 88 extend to the mount portion 98 of the housing 81, as shown in FIG. 10. The bus bars 87 and 88 are fixed to the extension portion 97 of the housing 81 by upwardly open front fasteners 161 and 161 and rear fasteners 162 and 162, and by laterally open intermediate fasteners 163 and 163.

The plus-side bus bar 87 is configured with one end connected to the plus contact piece 84 and the other end connected to the plus terminal 91. The minus-side bus bar 88 is configured with one end connected to the minus contact piece 85 and the other end connected to the minus terminal 92.

The minus terminal 92 is mechanically and electrically attached to the crankcase 13 by a bolt that acts as a ground terminal.

The wiring is fixed from the plus and minus terminals 91 and 92 to the switch 145 by providing bus bars 87 and 88 to the extension portion 97, and an improvement in the reliability of the switch 145 in the oil can be assured.

Figure 11:
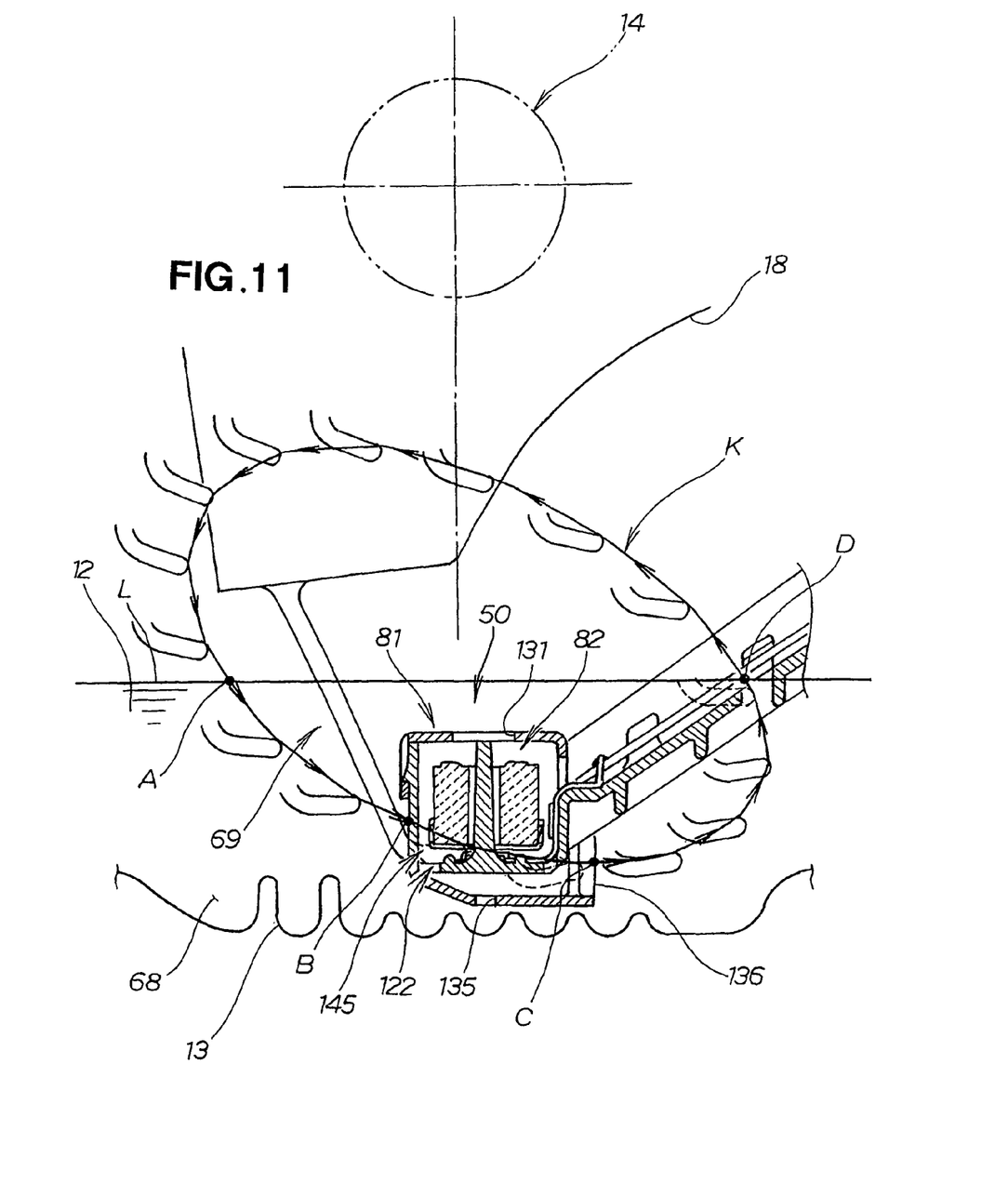
FIG. 11 is a diagram showing the relationship between the detection apparatus and the dipper trajectory.

The oil dipper 69 lifts oil (lubricating oil) 12 in accompaniment with the rotation of the crank shaft 14 in the crankcase 13, and supplies oil 12 to the slidable parts of the engine. The trajectory of the distal end of the oil dipper 69 is an ellipsis tilted in the rightward direction, as shown in FIG. 11.

In this configuration, the oil surface entrance point A is the point at which the distal end of the oil dipper 69 enters the oil 12, the front wall passage point B is the point at which the distal end passes through the front wall of the oil-level detection apparatus 50, the through-hole passage point C is the point at which the distal end passes through the through-hole 136, the oil surface exit D is the point at which the distal end exits from the surface of the oil 12, the oil level L is the surface of the oil 12, and K is the trajectory of the oil dipper 69.

The oil dipper 69 moves diagonally below the oil level L from the oil surface entrance point A to the front wall passage point B, moves substantially horizontally from the front wall passage point B to the through-hole passage point C, and moves diagonally upward from the through-hole passage point C to the oil surface exit point D.

When the engine has started or is operating at low revolutions, the revolutions of the oil dipper 69 are also low, and large waves with a low frequency are generated in the oil 12. In other words, the oil level L experiences large fluctuations. In this case, first, the peaks of the waves collide with the housing 81 of the oil-level detection apparatus 50, and the trough of the waves that are lower than the surface of the oil come close to the housing. Thus, when the surface of the oil surges, the oil 12 in the housing 81 also surges, the float 82 may drop, and the oil-level detection apparatus 50 may malfunction. Therefore, the effect of the fluctuations in the surface of the oil on the oil level detection apparatus 50 must be kept to a minimum.

In view of the above situation, the through-hole 136 is not provided in a position that faces the movement of the oil dipper 69, but a sufficient amount of oil 12 is left in the housing 81 by disposing a wall portion in the facing position. In other words, since the position that faces the direction in which the waves move is directly affected by the fluctuations of the waves, the through-hole 136 is disposed in the housing 81 in a position that is on the opposite side of the position that faces the movement direction of the waves so that the housing 81 is not directly affected by the fluctuation of the waves. The oil 12 in the housing 81 is thereby not affected directly by the fluctuations of the waves, the oil-level detection apparatus 50 can stably detect the oil level, and an improvement in reliability can be assured.

Described in the present example is an example of an OHC air-cooled engine 10 in which the cylinder is sloped, but the present invention is not limited thereby, and any number of pistons and any arrangement of the cylinders is possible (in-line or V configuration, for example).

INDUSTRIAL APPLICABILITY

The oil-level detection apparatus of the present invention is useful in small air-cooled engines and automobile engines.

The invention claimed is:

1. An apparatus for detecting the surface level of oil in the oil pooling chamber of an engine, the apparatus comprising:
a float which floats in said oil;
a switch actuated by the movement of said float; and
a housing for housing said float and said switch;
wherein said housing has, in the sidewall on the opposite side of the sidewall that faces the movement of an oil dipper, a through-hole that leads to said oil pooling chamber when said dipper for lifting up said oil moves in the vicinity of said housing; and
wherein said switch comprises a conduction piece disposed under said float, and a plus contact piece and a minus contact piece disposed on said housing while allowed to be in contact with said conduction piece; and
wherein said housing is provided with said plus contact piece and said minus contact piece mounted thereon, and comprises a housing main body for accommodating said float, and upper cover for covering the upper portion of said housing main body, a lower cover for covering the lower portion of said housing main body, and an extension portion that extends from one end of the housing main body, wherein one end of said extension portion can be mounted on said engine main body, and said sidewall is said lower cover.

2. The detection apparatus of claim 1, wherein said extension portion is provided with a bus bar to which said plus contact piece and said minus contact piece are connected.

3. The detection apparatus of claim 1, wherein said lower cover has a tapered portion that is formed on the bottom surface of the side that faces the movement direction of said dipper.

4. The detection apparatus of claim 1, wherein said upper cover and lower cover have stop portions for stopping said housing main body; and said housing main body has pawls for engaging said stop portions.

5. The detection apparatus of claim 1, wherein said lower cover has a lower hole for allowing oil to flow from the lower portion of said lower cover into said housing main body.

6. The detection apparatus of claim 1, wherein said upper cover has an upper hole for allowing oil that has splashed up to flow into said housing main body.

* * * * *